United States Patent
Nakajima et al.

(10) Patent No.: US 9,747,123 B2
(45) Date of Patent: Aug. 29, 2017

(54) TECHNOLOGIES FOR MULTI-LEVEL VIRTUALIZATION

(71) Applicant: Intel Corporation, Santa Clara, CA (US)

(72) Inventors: Jun Nakajima, San Ramon, CA (US); Asit K. Mallick, Saratoga, CA (US); Harshawardhan Vipat, San Jose, CA (US); Madhukar Tallam, Fremont, CA (US); Manohar R. Castelino, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/866,187

(22) Filed: Sep. 25, 2015

(65) Prior Publication Data

US 2017/0090963 A1      Mar. 30, 2017

(51) Int. Cl.
*G06F 9/455*    (2006.01)

(52) U.S. Cl.
CPC ............... *G06F 9/45558* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| 2008/0288940 | A1  | 11/2008 | Adams et al. | |
|---|---|---|---|---|
| 2011/0047544 | A1* | 2/2011  | Yehuda | G06F 9/4555 718/1 |
| 2011/0078361 | A1* | 3/2011  | Chen | G06F 12/145 711/6 |
| 2011/0197190 | A1  | 8/2011  | Hattori | |
| 2012/0191948 | A1  | 7/2012  | Day et al. | |
| 2013/0007325 | A1* | 1/2013  | Sahita | G06F 13/24 710/267 |
| 2013/0232490 | A1  | 9/2013  | Moriki et al. | |

(Continued)

OTHER PUBLICATIONS

International Search Report for PCT/US16/48681, dated Dec. 2, 2016 (3 pages).

(Continued)

*Primary Examiner* — Dong Kim
(74) *Attorney, Agent, or Firm* — Barnes & Thornburg LLP

(57) ABSTRACT

Technologies for multi-level virtualization include a computing device having a processor that supports a root virtualization mode and a non-root virtualization mode. A non-root hypervisor determines whether it is executed under control of a root hypervisor, and if so, registers a callback handler and trigger conditions with the root hypervisor. The non-root hypervisor hosts one or more virtual machines. In response to a virtual machine exit, the root hypervisor determines whether a callback handler has been registered for the virtual machine exit reason and, if so, evaluates the trigger conditions associated with the callback handler. If the trigger conditions are satisfied, the root hypervisor invokes the callback handler. The callback handler may update a virtual virtualization support object based on changes made by the root hypervisor to a virtualization support object. The root hypervisor may invoke the callback handler in the non-root virtualization mode. Other embodiments are described and claimed.

24 Claims, 6 Drawing Sheets

(56) References Cited

U.S. PATENT DOCUMENTS

2014/0123235 A1* 5/2014 Dewan .................... G06F 21/62
                                                    726/4
2014/0173600 A1* 6/2014 Ramakrishnan Nair ..................
                                                   G06F 9/461
                                                    718/1
2015/0379263 A1* 12/2015 Vipat ..................... G06F 21/79
                                                    726/23

OTHER PUBLICATIONS

Written Opinion for PCT/US16/48681, dated Dec. 2, 2016 (6 pages).

* cited by examiner

TECHNOLOGIES FOR MULTI-LEVEL VIRTUALIZATION

BACKGROUND

Typical computer processors include hardware support for virtualization operations. Software virtualization includes transparently executing one or more guest operating systems from within a host operating system, hypervisor, or virtual machine monitor (VMM). Hardware virtualization features may include an extended privilege model, hardware-assisted support for virtual memory addressing, support for extended memory permissions, and other virtualization features.

Certain computing devices include a thin hypervisor to monitor or check integrity of the host operating system. However, computing systems including a thin hypervisor may have difficulty executing additionally hypervisors or VMMs, such as VMMs that are hosted by the host operating system, while still maintaining security. For example, hosted VMMs typically have privileged components in the host operating system that can potentially compromise security of the host operating system. Alternatively, to protect security assertions of the host operating system, a thin hypervisor may make hardware virtualization features unavailable to hosted VMMs and/or virtualize the hardware features for the hosted VMM and run the hosted VMM in a nested and/or deprivileged mode.

In systems with nested virtualization, the thin hypervisor virtualizes each virtual machine (VM) exit, which may cause a large number of additional VM exits between the thin hypervisor and the hosted VMM. Certain processors manufactured by Intel® Corporation include hardware features such as virtual machine control structure (VMCS) shadowing that may reduce the number of VM exits. However, in those embodiments the thin hypervisor still performs nested VM exit handling for each VM exit.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
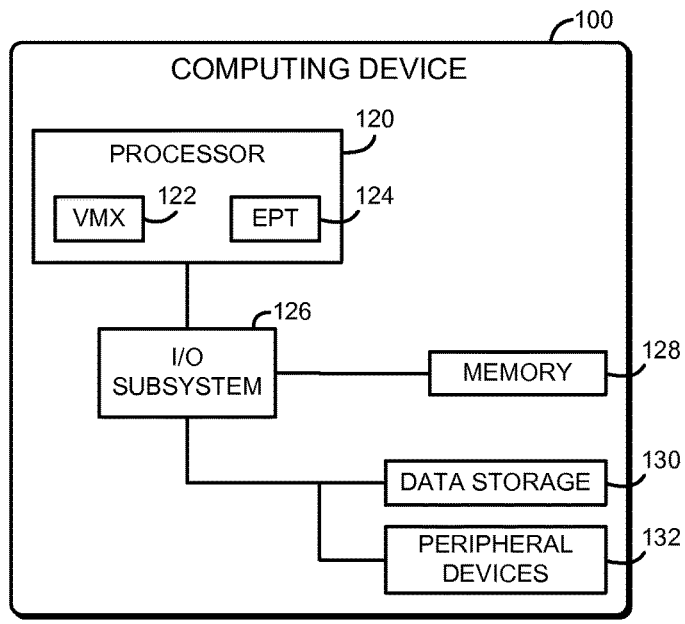
FIG. 1 is a simplified block diagram of at least one embodiment of a computing device for multi-level virtualization.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for secure inter-virtual-machine shared memory communication includes a processor 120 that supports execution in a root virtualization mode and a non-root virtualization mode. In operation, as described further below, the computing device 100 establishes a root hypervisor that executes in the root virtualization mode and a non-root hypervisor that executes in the non-root virtualization mode. The root hypervisor may perform security and performance-intensive operations such as generic handlers for virtual machine exits. The non-root hypervisor may register one or more callback handlers and associated trigger conditions with the root hypervisor. In response to a virtual machine exit, if the trigger condition is satisfied, the root hypervisor may switch to the non-root virtualization mode and execute the registered callback handler. Thus, the computing device 100 may enable two-level virtualization without nested virtualization or software emulation, and thus may greatly improve virtualized performance. For example, by handling the virtual machine exit in the root hypervisor and evaluating trigger conditions, the computing device 100 may avoid executing many virtual machine exits compared to nested virtualization. Additionally, the computing device 100 may batch or otherwise multiplex virtualization operations and use lists of updates to virtualization support objects to avoid full virtualization of all virtualization support objects. By including higher-level functionality in the non-root hypervisor, the root hypervisor may have a smaller code based compared to traditional virtual machine monitors or hypervisors and, thus, the computing device 100 may also have a reduced trusted code base.

The computing device 100 may be embodied as any type of device capable of performing multi-level virtualization and otherwise performing the functions described herein. For example, the computing device 100 may be embodied as, without limitation, a workstation, a server computer, a distributed computing system, a multiprocessor system, a laptop computer, a notebook computer, a tablet computer, a smartphone, a mobile computing device, a wearable computing device, a computer, a desktop computer, a consumer electronic device, a smart appliance, and/or any other computing device capable of inter-virtual-machine shared memory communication. As shown in FIG. 1, the illustrative computing device 100 includes the processor 120, an I/O subsystem 126, a memory 128, and a data storage device 130. Of course, the computing device 100 may include other or additional components, such as those commonly found in a notebook computer (e.g., various input/output devices), in other embodiments. Additionally, in some embodiments, one or more of the illustrative components may be incorporated in, or otherwise form a portion of, another component. For example, the memory 128, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Additionally, although illustrated as including a single processor 120, it should be understood that in some embodiments the computing device 100 may include multiple processors 120. The processor 120 includes hardware-based, hardware-assisted, or hardware-accelerated support for virtualization. In particular, the processor 120 includes virtual machine extensions (VMX) support 122 and extended page table (EPT) support 124. The VMX support 122 supports virtualized execution of operating systems and other guests by providing two modes of execution: VMX-root mode and VMX non-root mode. The VMX-root mode allows executing software to have broad control of the computing device 100 and its hardware resources. Accordingly, a root hypervisor may execute in VMX-root mode. The VMX non-root mode restricts access to certain hardware instructions while still implementing the ordinary ring/privilege system of the processor 120. Thus, a non-root hypervisor and one or more guest virtual machines (VMs) and/or operating systems (OSs) may execute in the VMX non-root mode. The execution of certain hardware instructions and certain other system events may trigger hardware-assisted transitions to VMX-root mode. Those hardware-assisted transitions are commonly known as virtual machine exits (VMExits) or hypercalls. Upon encountering a VMExit, the processor 120 may switch context from the guest VM or non-root hypervisor to the root hypervisor in order to handle the VMExit. Thus, in some embodiments VMExits may impose a performance penalty on virtualized code. The VMX support 122 may be embodied as, for example, Intel® VT-x technology.

The EPT support 124 supports hardware-assisted second-level page address translation. For nonvirtualized workloads (or when operating in VMX-root mode), the processor 120 may provide hardware-assisted translation between virtual memory addresses (also known as linear addresses) to physical memory addresses. The processor 120 may translate memory addresses using one or more page table structures stored in the memory 128 and managed by a host operating system, hypervisor, or VMM. For virtualized workloads (or when operating in VMX non-root mode), the processor 120 supports hardware-assisted translation between virtual memory addresses (used, for example, by applications executing within a guest VM) to guest-physical memory addresses. A guest OS may maintain one or more page table structures in the memory 128 to manage the translation to guest-physical memory addresses. However, a guest-physical memory address may not correspond to an actual physical memory address within the memory 128. The EPT support 124 provides hardware-assisted translation between guest-physical memory addresses to physical memory addresses (also known as host-physical memory addresses). The EPT support 124 may translate memory addresses using one or more extended page table structures stored in the memory 128 and managed by the root hypervisor. Without the EPT support 124, translation between guest-physical memory addresses and physical memory addresses may require one or more VMExits. The EPT support 124 also may support associating access permissions with each guest physical page and/or physical page (e.g., read, write, and/or execute permissions). Permissions violations, which may be known as EPT violations, may generate VMExits that allow the root hypervisor to handle the EPT violation. The EPT support 124 may be embodied as, for example, Intel® VT-x technology.

The memory 128 may be embodied as any type of volatile or non-volatile memory or data storage capable of performing the functions described herein. In operation, the memory 128 may store various data and software used during operation of the computing device 100 such operating systems, applications, programs, libraries, and drivers. The memory 128 may also include one or more virtualization support objects that may be used to control virtualization functions of the processor 120. For example, the memory 128 may include one or more virtual machine control structures (VMCSs), which may be used to configure and otherwise control virtual machines executed by the computing device 100. As another example, the memory 128 may include one or more extended page tables (EPTs). As described further below, the memory 128 may also include one or more virtual virtualization support objects that are managed by the non-root hypervisor.

The memory 128 is communicatively coupled to the processor 120 via the I/O subsystem 126, which may be embodied as circuitry and/or components to facilitate input/output operations with the processor 120, the memory 128, and other components of the computing device 100. For example, the I/O subsystem 126 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 126 may form a portion of a system-on-a-chip (SoC) and be incorporated, along with the processor 120, the memory 128, and other components of the computing device 100, on a single integrated circuit chip.

The data storage device 130 may be embodied as any type of device or devices configured for short-term or long-term storage of data such as, for example, memory devices and circuits, memory cards, hard disk drives, solid-state drives, or other data storage devices. In some embodiments, the computing device 100 may also include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, network adapter, communication circuitry, and/or other input/output devices, interface devices, and/or peripheral devices.

Figure 2:
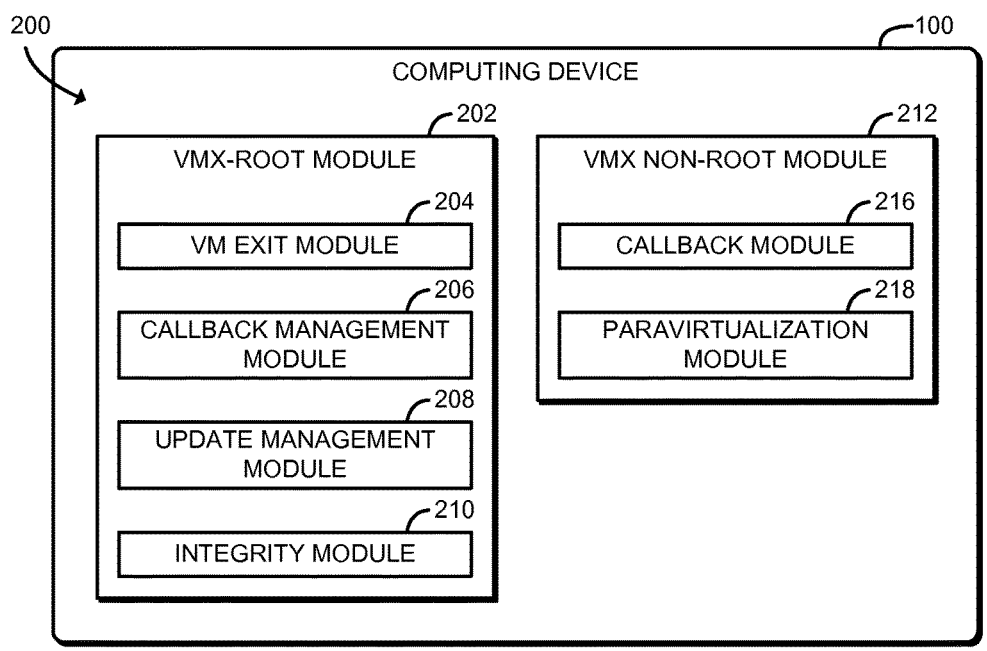
FIG. 2 is a simplified block diagram of at least one embodiment of an environment of the computing device of FIG. 1.

Referring now to FIG. 2, in the illustrative embodiment, the computing device 100 establishes an environment 200 during operation. The illustrative embodiment 200 includes a VMX-root module 202 and a VMX non-root module 212. As shown, the VMX-root module 202 includes a virtual machine exit module 204, a callback management module 206, an update management module 208, and an integrity module 210. The VMX non-root module 212 includes a callback module 216 and a paravirtualization module 218. The various modules of the environment 200 may be embodied as hardware, firmware, software, or a combination thereof. For example, each of the modules, logic, and other components of the environment 200 may form a portion of, or otherwise be established by, the processor 120 or other hardware components of the computing device 100. As such, in some embodiments, any one or more of the modules of the environment 200 may be embodied as a circuit or collection of electrical devices (e.g., a virtual machine exit circuit 204, a callback circuit 216, etc.).

The virtual machine exit module 204 is configured to receive, by a root hypervisor, a virtual machine exit generated by a virtual machine of the computing device 100. As describe further below, the virtual machine is hosted by a non-root hypervisor of the computing device 100. The virtual machine exit module 204 is configured to operate in a root virtualization mode of the processor 120, such as the VMX-root mode. The virtual machine exit module 204 may be further configured to process, by the root hypervisor in the root virtualization mode, the virtual machine exit after it is determined that a callback handler is not registered for the exit reason of the virtual machine exit. The virtual machine exit module 204 may be further configured to resume execution of the virtual machine after processing the virtual machine exit or after it is determined that a trigger condition associated with the callback handler is not satisfied.

The callback management module 206 is configured to determine, by the root hypervisor in the root virtualization mode, whether a callback handler of the non-root hypervisor is registered for the exit reason of the virtual machine exit. The callback management module 206 is further configured to determine, by the root hypervisor in the root virtualization mode, whether a trigger condition associated with the callback handler is satisfied if it is determined that the callback handler is registered.

The update management module 208 is configured to determine, by the root hypervisor in the root virtualization mode, whether a virtual virtualization support object of the non-root hypervisor has been modified in response to executing the callback handler. The virtual virtualization support object may be embodied as, for example, a virtual machine control structure (VMCS) or a virtual extended page table (EPT). The update management module 208 is further configured to update, by the root hypervisor in the root virtualization mode, a virtualization support object of the computing device 100 based on the virtual virtualization support object in response determining that the virtual virtualization support object has been modified. Similarly, the virtualization support object may be embodied as a VMCS or an EPT. The update management module 208 is further configured to resume, by the root hypervisor, execution of the virtual machine in response to updating the virtualization support object. In some embodiments, updating the virtualization support object may include verifying, by the root hypervisor, validity of the virtual virtualization support object. In some embodiments, the update management module 208 may be further configured to modify, by the root hypervisor in the root virtualization mode, the virtualization support object after receiving of the virtual machine exit and generate, by the root hypervisor in the root virtualization mode, a list of changes to the virtualization support object that may be provided to the non-root hypervisor.

The integrity module 210 is configured to monitor, by the root hypervisor in the root virtualization mode, execution of the non-root hypervisor. In some embodiments, the integrity module 210 may be further configured to monitor, by the root hypervisor in the root virtualization mode, execution of a host operating system of the computing device 100. As described below, the host operating system may host the non-root hypervisor.

The callback module 216 is configured to execute the callback handler of the non-root hypervisor if it is determined that the trigger condition is satisfied. In some embodiments, the callback module 216 may be configured to execute the callback handler in the non-root virtualization mode of the processor 120. The callback module 216 may be further configured to update, by the non-root hypervisor, the virtual virtualization support object based on the virtualization support object. The callback module 216 may be configured to use the list of changes to the virtualization support object provided by the root hypervisor. The callback module 216 may be further configured to modify, by the non-root hypervisor, the virtual virtualization support object while executing the callback handler and to generate, by the non-root hypervisor, a list of changes to the virtual virtualization support object.

The paravirtualization module 218 is configured to determine, by the non-root hypervisor, whether the non-root hypervisor is executed in the non-root virtualization mode. The paravirtualization module 218 is further configured to register, by the non-root hypervisor, the callback handler and the associated trigger condition with the root hypervisor after determining that the non-root hypervisor is executed in the non-root virtualization mode. The paravirtualization module 218 may be further configured to host the virtual machine by the non-root hypervisor in the root virtualization mode after determining that the non-root hypervisor is not executed in the non-root virtualization mode.

Figure 3:
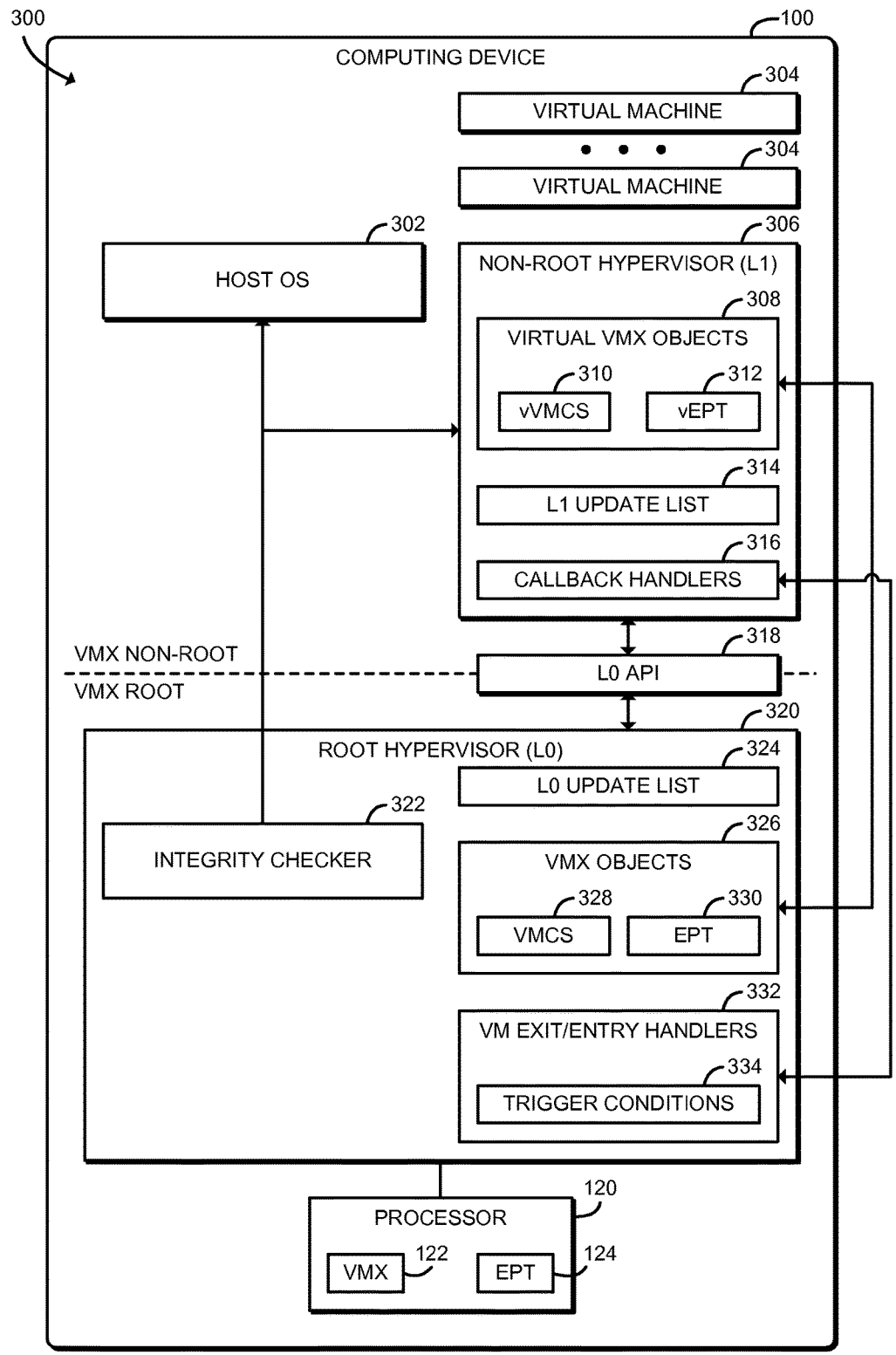
FIG. 3 is a simplified block diagram of at least one embodiment of a hypervisor environment that may be established by the computing device of FIGS. 1-2.

Referring now to FIG. 3, in use, the computing device 100 may establish a hypervisor environment 300. As shown, the illustrative hypervisor environment 300 includes a host operating system 302, one or more virtual machines 304, a non-root hypervisor 306, and a root hypervisor 320. The host operating system 302 may be embodied as any operating system or other control structure of the computing device 100. As shown, the host operating system 302 is executed in the VMX non-root mode.

The root hypervisor 320—also known as the level zero or L0 hypervisor—may be embodied as a hypervisor, virtual machine monitor (VMM), or other control structure of the computing device 100 that executes in VMX-root mode. The root hypervisor 320 may be "thin"; that is, the root hypervisor 320 may have a relatively small code base. For example, the root hypervisor 320 may provide only hardware virtualization abstractions and isolation, without providing full virtualization of guests. As shown, the root hypervisor 320 may include an integrity checker 322 to monitor and/or integrity check the host operating system 302 and/or the non-root hypervisor 306.

The non-root hypervisor 306—also known as the level one or L1 hypervisor—may be embodied as a hosted VMM, hypervisor, or other control structure of the computing device 100 that may execute in VMX non-root mode. The non-root hypervisor 306 may provide full virtualization of guests (e.g., the virtual machines 304) and thus may have a relatively large code base. Because the non-root hypervisor 306 may not execute in VMX-root mode, the non-root hypervisor 306 need not be part of the trusted code base of the computing device 100.

As shown in FIG. 3 and as described further below, the root hypervisor 320 maintains a collection of VMX objects 326 including, for example, one or more virtual machine control structures (VMCSs) 328 and/or extended page tables (EPTs) 330. As described further below, the VMX objects 326 may include any in-memory structure used by the processor 120 to control execution of virtualized code. Similarly, the non-root hypervisor 306 maintains a collection of virtual VMX objects 308 including, for example, one or more virtual VMCSs 310 and/or virtual EPTs 312. As further described below, updates to the virtual VMX objects 308 may be propagated to the VMX objects 326 and vice versa. As shown in FIG. 3, updates may be propagated using a non-root hypervisor update list 314 and a root hypervisor update list 324, which may indicate changes made by the non-root hypervisor 306 to the virtual VMX objects 308 and changes made by the root hypervisor 320 to the VMX objects 326, respectively.

The root hypervisor 320 further establishes one or more virtual machine (VM) exit/entry handlers 332. The VM exit/entry handlers 332 may be embodied as any function, method, vector, or other routine that may be invoked by the processor 120 in response to a virtual machine exit and/or a virtual machine entry. The non-root hypervisor 306 further includes one or more callback handlers 316, which may be embodied as any function, method, vector, or other routine that may be invoked by the root hypervisor 320, for example in response to a VM exit. As described further below, the root hypervisor 320 may evaluate one or more trigger conditions 334 to determine whether to invoke a callback handler 316.

As shown, the computing device 100 further includes a root hypervisor application programming interface (API) 318 provided by the root hypervisor 320. The root hypervisor API 318 may be embodied as any function calls, hypercalls, virtual machine exits, specialized processor instruction, or other interface elements that may be used by the non-root hypervisor 306 to communicate with the root hypervisor 320. Accordingly, in some embodiments, the non-root hypervisor 306 may be paravirtualized; that is, the non-root hypervisor 306 may be capable of determining that it is executing under the supervision of a root hypervisor 320, for example by accessing the root hypervisor API 318.

For example, the root hypervisor API 318 may include hypercalls to configure VM exit handling for each VM exit reason, such as a VmExitHandle( ) hypercall. The VmExitHandle( ) hypercall may specify the reasons for the VM exit, a pointer to a callback handler 316, the (reason-specific) trigger conditions 334, a pointer to a virtual VMX object 308 (e.g., a virtual VMCS 310 or a virtual EPT 312), the L1 update list 314, the L0 update list 324, and/or other data. As another example, the root hypervisor API 318 may include hypercalls to handle the virtual VMCS 310 and/or the virtual EPT 312 (e.g., to perform invalidation or other tasks). The root hypervisor API 318 may include an UpdateVMCS( ) hypercall to request the root hypervisor 320 to update the VMCS 328, specifying a virtual VMCS 310 and the non-root hypervisor update list 314, and the root hypervisor API 318 may include an UpdateEPT( ) hypercall to request the root hypervisor 320 to update the EPT 330, specifying a virtual EPT 312 and the non-root hypervisor update list 314. In some embodiments, the API 318 may allow the non-root hypervisor 306 to execute one or more specialized processor instructions to access hardware virtualization functions of the processor 120 without generating a hypercall. For example, in some embodiments the non-root hypervisor 306 may execute the VMFUNC processor instruction to access the L0 update list 324, the VMX objects 326, or other data that has been designated by the root hypervisor 320.

Figure 4:
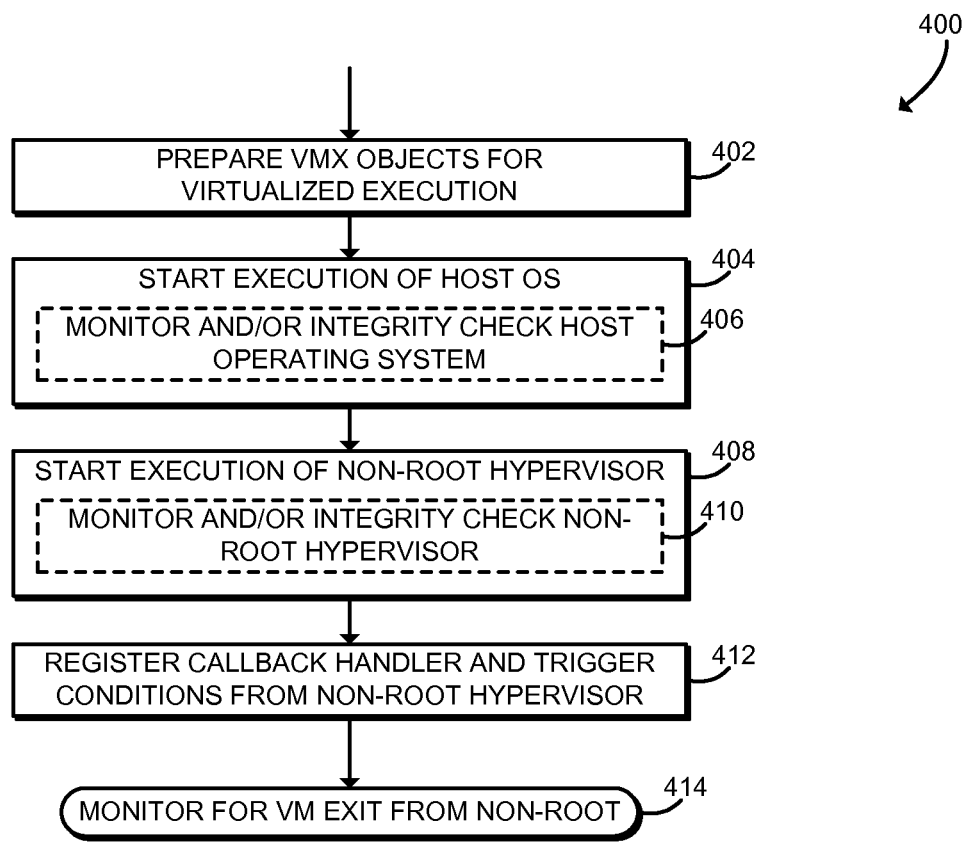
FIG. 4 is a simplified flow diagram of at least one embodiment of a method for root virtualization that may be executed by the computing device of FIGS. 1-3.

Referring now to FIG. 4, in use, the computing device 100 may execute a method 400 for root virtualization. The method 400 may be executed by the root hypervisor 320 and thus may execute in VMX-root mode with full access to the computing device 100. The method 400 begins in block 402, in which the computing device 100 prepares the VMX objects 326 for virtualized execution. The VMX objects 326 may include any in-memory structure used by the processor 120 to control execution of virtualized code. For example, the VMX objects 326 may include one or more virtual machine control structures (VMCSs) 328 and/or one or more extended page tables (EPTs) 330. The particular VMX objects 326 prepared may depend on the virtualization capabilities of the processor 120 as well as the particular virtualization workload of the computing device 100. For example, the root hypervisor 320 may prepare a VMCS 328 for every virtual CPU and an EPT 330 for every virtual machine 304.

In block 404, the computing device 100 starts execution of the host operating system 302. The host operating system 302 may execute in the VMX non-root mode. For example, the root hypervisor 320 may perform a VM entry operation into the host operating system 302 to start execution of the host operating system 302. In some embodiments, in block 406, the root hypervisor 320 may monitor and/or integrity-check the host operating system 302. The root hypervisor 320 may identify and monitor certain critical executable images, data structures, or other memory locations, for example by verifying checksums of the critical memory locations. The root hypervisor 320 may use any appropriate technique to monitor or integrity-check the host operating system 302, including using virtualization features of the processor 120. For example, the root hypervisor 320 may monitor for modifications to certain locations in memory by monitoring for VM exits, by setting permissions on one or more EPTs 330, or by using other virtualization features.

In block 408, the computing device 100 starts execution of the non-root hypervisor 306. The non-root hypervisor 306 may execute in VMX non-root mode. The host operating system 302 may execute the non-root hypervisor 306 as an ordinary process in the VMX non-root mode. Additionally or alternatively, the root hypervisor 320 may start execution of the non-root hypervisor 306 in the VMX non-root mode. In some embodiments, in block 410, the root hypervisor 320 may monitor and/or integrity-check the non-root hypervisor 306. The root hypervisor 320 may identify and monitor certain critical executable images, data structures, or other memory locations, for example by verifying checksums of the critical memory locations. The root hypervisor 320 may use any appropriate technique to monitor or integrity-check the non-root hypervisor 306, including using virtualization features of the processor 120. For example, the root hypervisor 320 may monitor for modifications to certain locations in memory by monitoring for VM exits, by setting permissions on one or more EPTs 330, or by using other virtualization features.

In block 412, the root hypervisor 320 of the computing device 100 registers one or more callback handlers 316 and associated trigger conditions 334 submitted by the non-root hypervisor 306. Each callback handler 316 may be embodied as any function, method, vector, or other routine of the non-root hypervisor 306 that may be invoked by the root hypervisor 320. The root hypervisor 320 may register a callback handler 316 for one or more potential VM exit reasons. Each trigger condition 334 may be embodied as any policy, filter, or other conditional test that may be evaluated by the root hypervisor 320. As described further below, the trigger conditions 334 are evaluated to determine whether to call the associated callback handler 316. The root hypervisor 320 may register the callback handlers 316 and trigger conditions 334 in response to one or more calls to the root hypervisor application programming interface (API) 318. For example, the non-root hypervisor 306 may invoke one or more function calls, hypercalls, virtual machine exits, or other interface elements of the API 318 to register the callback handlers 316 and/or trigger conditions 334. When registering the callback handler 316, the non-root hypervisor 306 may also supply additional information, such as pointers to virtual VMX objects 308, or lists of requested VMCS 328 field updates to be made by the root hypervisor 320.

In block 414, the root hypervisor 320 of the computing device 100 monitors for VM exits generated from the VMX non-root mode. The VM exits may be generated by, for example, one or more of the host operating system 302, the virtual machines 304, and/or the non-root hypervisor 306. The root hypervisor 320 may use any technique to monitor for VM exits. For example, in some embodiments, the root hypervisor 320 may sleep, yield, or otherwise stop processing and wait for the processor 120 to invoke a VM exit handler 332 in response to a VM exit. While the root hypervisor 320 monitors for VM exits, the method 400 is completed, but the host operating system 302, the virtual machines 304, and the non-root hypervisor 306 may continue executing on the computing device 100.

Figure 5:
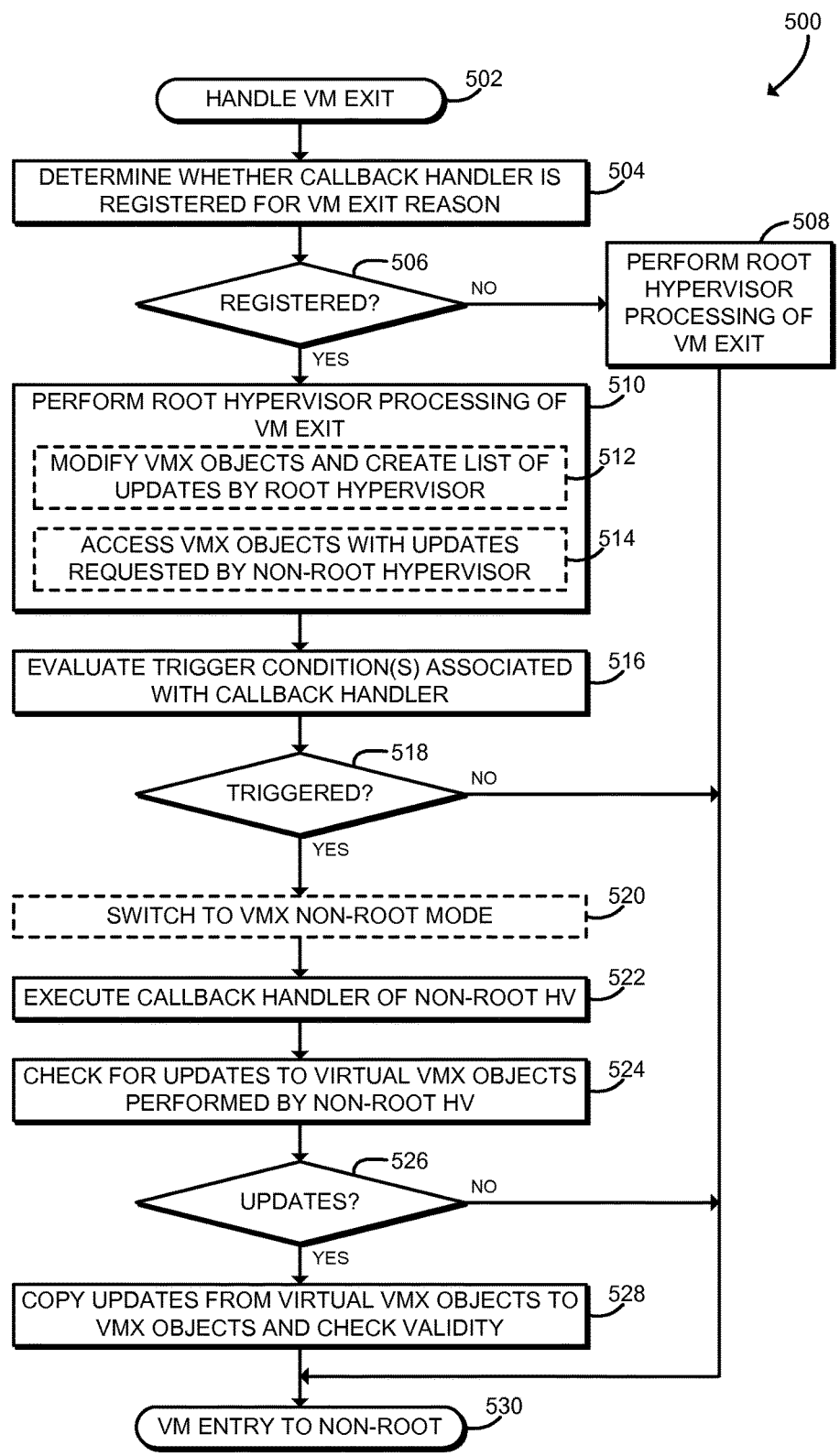
FIG. 5 is a simplified flow diagram of at least one embodiment of a method for virtual machine exit handling that may be executed by the computing device of FIGS. 1-3.

Referring now to FIG. 5, in use, the computing device 100 may execute a method 500 for virtual machine exit handling. The method 500 may be executed by the root hypervisor 320 and thus may execute in VMX-root mode with full access to the computing device 100. The method 500 begins in block 502, in which the computing device 100 handles a virtual machine exit. As described above, the virtualization support of the processor 120 may invoke a VM exit handler 332 of the root hypervisor 320 in response to the VM exit. The VM exit handler 332 executes in the VMX-root mode.

In block 504, the computing device 100 determines whether a callback handler 316 has been registered for the VM exit reason of the current VM exit. The computing device 100 may generate VM exits for many reasons, such as an interrupt, fault, software interrupt, EPT violation, express VM exit command, or other VM exit reason. As described above in connection with block 412, the non-root hypervisor 306 may register callback handlers 316 for particular VM exit reasons with the root hypervisor 320. The computing device 100 may use any technique to determine the exit reason of the current VM exit. For example, the computing device 100 may read one or more fields of the VMCS 328. In block 506, the computing device 100 checks whether a callback handler 316 is registered. If so, the method 500 proceeds to block 510, described below. If a callback handler 316 is not registered, the method 500 branches to block 508.

In block 508, the root hypervisor 320 of the computing device 100 processes the VM exit. The root hypervisor 320 may perform any appropriate processing of the VM exit, including modifying VMX objects 326 or performing other virtualization tasks. In some embodiments, the root hypervisor 320 may perform generic or default VM exit handling operations. Thus, the root hypervisor 320 may process certain VM exits without the involvement of the non-root hypervisor 306. For example, in some embodiments, a VM exit caused by executing the CPUID instruction may be handled by the root hypervisor 320 without invoking the non-root hypervisor 306. After processing the VM exit, the method 500 branches ahead to block 530, in which the root hypervisor 320 executes a VM entry to the VMX non-root mode, for example resuming execution of the host operating system 302, virtual machine 304, and/or non-root hypervisor 306.

Referring back to block 506, if a callback handler 316 is registered for the exit reason of the VM exit, the method 500 advances to block 510, in which the root hypervisor 320 processes the VM exit. As described above, the root hypervisor 320 may perform any appropriate processing of the VM exit, including generic or default VM exit processing. In some embodiments, in block 512, the root hypervisor 320 may modify one or more VMX objects 326 (e.g., the VMCS 328 and/or EPT 330) and create a list 324 of updates performed by the root hypervisor 320. The root hypervisor update list 324 may identify particular VMX objects 326, fields, or other data modified by the root hypervisor 320. For example, the list 324 may be embodied as a bitmap identifying particular fields of the VMCS 328 and/or the EPT 330 that have been modified by the root hypervisor 320. Similarly, in some embodiments in block 514 the root hypervisor 320 may access one or more VMX objects 326 for which updates have been requested by the non-root hypervisor 306. As described above in connection with block 412 of FIG. 4, the non-root hypervisor 306 may request updates for particular VMX objects 326, fields, or other VMX data. The root hypervisor 320 may include the requested VMX objects 326, fields, or other data in the root hypervisor update list 324. The root hypervisor 320 may set one or more bits associated with the requested data, copy the requested data, or otherwise make the requested data available to the non-root hypervisor 306.

In block 516, the root hypervisor 320 of the computing device 100 evaluates one or more trigger conditions 334 that are associated with the callback handler 316 registered for the current VM exit reason. As described above, each trigger condition 334 may be embodied as any policy, filter, or other conditional test that may be evaluated by the root hypervisor 320. Because the trigger conditions 334 are specified by the non-root hypervisor 306 but evaluated by the root hypervisor 320, the trigger conditions 334 allow delegation of policy decisions from the non-root hypervisor 306 to the root hypervisor 320. In block 518, the root hypervisor 320 determines whether the trigger condition(s) 334 have been satisfied. If not, the method 500 branches ahead to block 530, in which the root hypervisor 320 executes a VM entry to the VMX non-root mode, for example resuming execution of the host operating system 302, virtual machine 304, and/or non-root hypervisor 306. If the trigger condition(s) 334 have been satisfied, the method 500 advances to block 520.

In block 520, in some embodiments the computing device 100 switches to the VMX non-root mode. For example, the root hypervisor 320 may execute a VM entry or otherwise switch to the VMX non-root mode. Switching to the VMX non-root mode may allow the root hypervisor 320 to maintain the security and/or integrity of the computing device 100 while executing the callback handler 316 as described below. Additionally or alternatively, in some embodiments, if the non-root hypervisor 306 is trusted by the root hypervisor 320, the computing device 100 may remain in the VMX-root mode while executing the callback handler 316, which may improve performance. In block 522, the computing device 100 executes the callback handler 316 of the non-root hypervisor 306. As the callback handler 316 executes, the callback handler 316 may modify one or more virtual VMX objects 308. One potential embodiment of a callback handler 316 is described further below in connection with FIG. 7.

After execution of the callback handler 316 is completed, execution of the method 500 resumes in block 524 in the VMX-root mode. In block 524, the computing device 100 checks for any updates to the virtual VMX objects 308 (e.g., the virtual VMCS 310 and/or the virtual EPT 312) performed by the non-root hypervisor 306 during execution of the callback handler 316. The computing device 100 may use any technique to determine whether the virtual VMX objects 308 have been updated. For example, the root hypervisor 320 may receive a non-root hypervisor update list 314 from the non-root hypervisor 306. The non-root hypervisor update list 314, similar to the root hypervisor update list 324, identifies virtual VMX objects 308, fields, or other data of the virtual VMX objects 308 that has been modified by the non-root hypervisor 306. The list 314 may be embodied as a bitmap identified fields of the virtual VMCS 310 and/or the virtual EPT 312 modified by the non-root hypervisor 306. In block 526, the computing device 100 determines whether the virtual VMX objects 308 were modified by the non-root hypervisor 306. If not, the method 500 branches ahead to block 530, in which the root hypervisor 320 executes a VM entry to the VMX non-root mode, for example resuming execution of the host operating system 302, virtual machine 304, and/or non-root hypervisor 306. If the virtual VMX objects 308 were modified, the method 500 advances to block 528.

In block 528, the computing device 100 copies updates from the virtual VMX objects 308 to the VMX objects 326. The computing device 100 may copy only those virtual VMX objects 308, fields, or other data that has changed, for example using the non-root hypervisor update list 314. As the computing device 100 copies the updated data (or before copying the updated data), the root hypervisor 320 may check the validity of data included in the virtual VMX objects 308. Thus, by copying only valid data, the root hypervisor 320 may maintain the security and integrity of the virtualization environment of the computing device 100. After copying the updates to the VMX objects 326, the method 500 advances to block 530, in which the root hypervisor 320 executes a VM entry to the VMX non-root mode, for example resuming execution of the host operating system 302, virtual machine 304, and/or non-root hypervisor 306. After entering non-root mode, the method 500 is completed.

Figure 6:
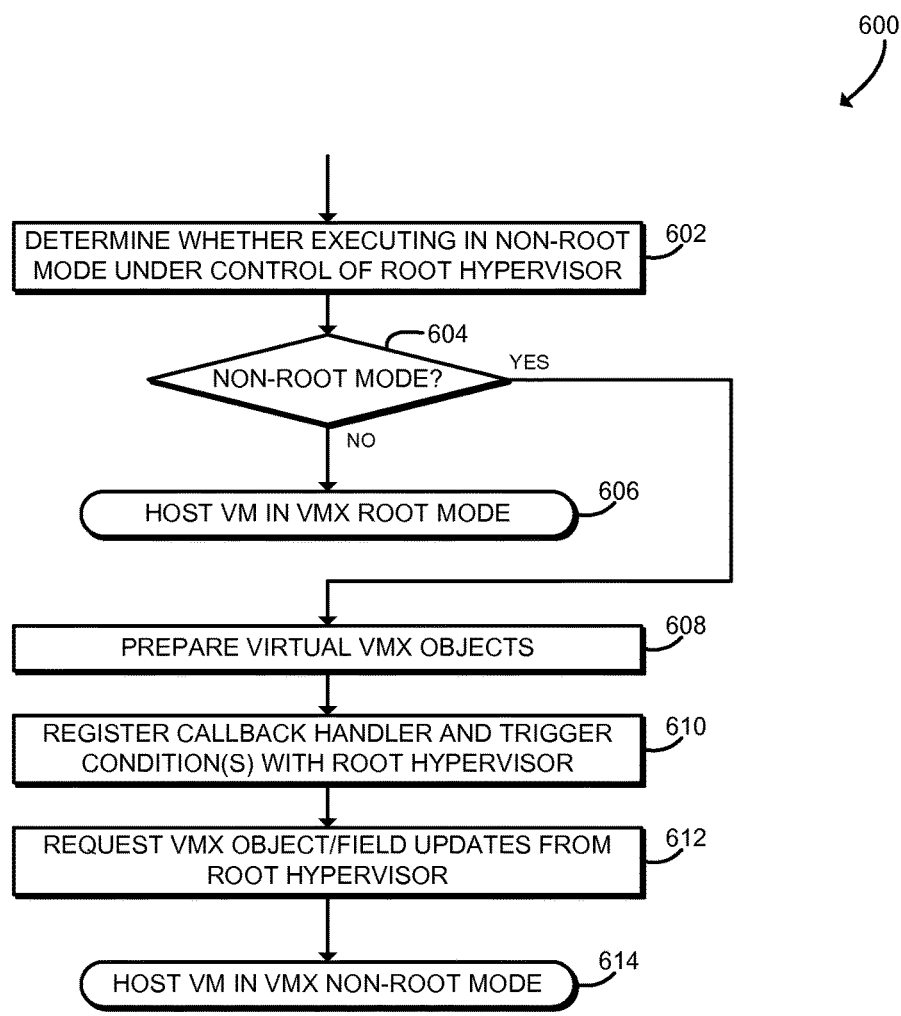
FIG. 6 is a simplified flow diagram of at least one embodiment of a method for non-root hypervisor paravirtualization that may be executed by the computing device of FIGS. 1-3.

Referring now to FIG. 6, in use, the computing device 100 may execute a method 600 for non-root hypervisor paravirtualization. The method 600 may be executed, for example, when the non-root hypervisor 306 is started, launched, or otherwise begins execution. The method 600 begins in block 602, in which the computing device 100 determines whether the non-root hypervisor 306 is executing in VMX non-root mode under control of the root hypervisor 320. For example, in the hypervisor environment 300 of FIG. 3 and in the method 400 of FIG. 4, the non-root hypervisor 306 is started in the VMX non-root mode by the host operating system 302 and/or the root hypervisor 320. However, in other embodiments, the non-root hypervisor 306 may execute without the root hypervisor 320 being present. For example, the non-root hypervisor 306 may be hosted by a host operating system 302 when the root hypervisor 320 is not active, or the non-root hypervisor 306 may execute as a "bare metal" hypervisor on the hardware of the computing device 100. The non-root hypervisor 306 may use any technique to determine whether the non-root hypervisor 306 is executing in VMX non-root mode under control of the root hypervisor 320. For example, the non-root hypervisor 306 may determine whether the root hypervisor API 318 is available, or the non-root hypervisor 306 may call one or more functions, hypercalls, or other routines of the root hypervisor API 318 to determine whether the root hypervisor 320 is active.

In block 604, the computing device 100 checks whether the non-root hypervisor 306 is executing in VMX non-root mode under control of the root hypervisor 320. If not, the method 600 advances to block 606, in which the non-root hypervisor 306 may host one or more virtual machines 304 in the VMX-root mode. Thus, in some embodiments the non-root hypervisor 306 may act as a legacy hosted hypervisor that is part of the trusted computing base of the computing device 100. Referring back to block 604, if the non-root hypervisor 306 is executing in VMX non-root mode under control of the root hypervisor 320, the method 600 advances to block 608.

In block 608, the computing device 100 prepares the virtual VMX objects 308 (e.g., the virtual VMCS 310 and/or the virtual EPT 312). The non-root hypervisor 306 may prepare the virtual VMX objects 308 as if they were actual VMX objects 326 used by the virtualization support of the processor 120. For example, the non-root hypervisor 306 may prepare a virtual VMCS 310 for every virtual CPU and a virtual EPT 312 for every virtual machine 304.

In block 610, the computing device 100 registers one or more callback handlers 316 and trigger conditions 334 with the root hypervisor 320. As described above, each callback handler 316 may be embodied as any function, method, vector, or other routine of the non-root hypervisor 306 that may be invoked by the root hypervisor 320. The non-root hypervisor 306 may register a callback handler 316 for one or more potential VM exit reasons. Each trigger condition 334 may be embodied as any policy, filter, or other conditional test that may be evaluated by the root hypervisor 320. As described further below, the trigger conditions 334 are evaluated to determine whether to call the associated callback handler 316. The non-root hypervisor 306 may register the callback handlers 316 and trigger conditions 334 by making one or more calls to the root hypervisor API 318. For example, the non-root hypervisor 306 may invoke one or more function calls, hypercalls, virtual machine exits, or other interface elements of the API 318 to register the callback handlers 316 and/or trigger conditions 334, for example by submitting a function pointer associated with each callback handler 316, pointers to virtual VMX objects 308 (e.g., pointers to a virtual VMCS 310 and/or virtual EPT 312), or other data.

In block 612, the non-root hypervisor 306 may request VMX object 326 and/or VMX object field updates from the root hypervisor 320. For example, when registering the callback handler 316, the non-root hypervisor 306 may also supply additional information, such as lists of requested VMCS 328 field updates to be made by the root hypervisor 320. As described above in connection with FIG. 5, while handling VM exits, the root hypervisor 320 may copy or otherwise make available the requested VMX objects 326, fields, or other data to the non-root hypervisor 306.

In block 614, the non-root hypervisor 306 hosts the virtual machines 304 in the VMX non-root mode. The non-root hypervisor 306 may use any appropriate technique to start execution of the virtual machines 304. For example, the non-root hypervisor 306 may execute a VM entry, which may be handled by the root hypervisor 320 to start the virtual machines 304. After starting execution of the virtual machines 304, the method 600 is completed. As described above, during execution of the virtual machines 304, the root hypervisor 320 may handle any VM exits generated by the virtual machines 304, and in turn may invoke one or more callback handlers 316 as described further below in connection with FIG. 7.

Figure 7:
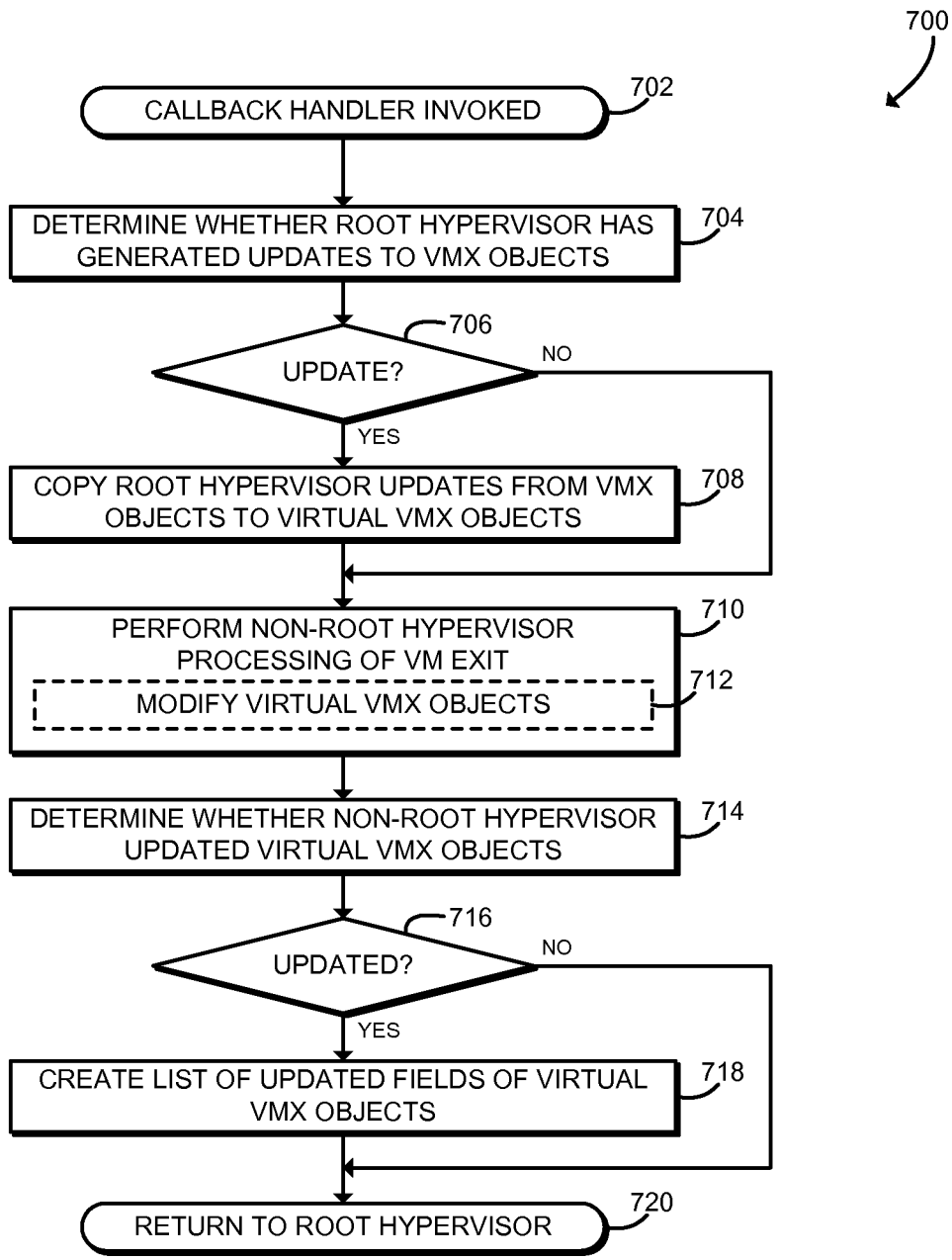
FIG. 7 is a simplified flow diagram of at least one embodiment of a method for non-root callback handling that may be executed by the computing device of FIGS. 1-3.

Referring now to FIG. 7, in use, the computing device 100 may execute a method 700 for non-root callback handling. The method 700 may be executed by the non-root hypervisor 306 and may execute in VMX non-root mode, with limited access to the computing device 100. The method 700 begins in block 702, in which the computing device 100 invokes the callback handler 316. As described above in connection with blocks 520, 522 of FIG. 5, the root hypervisor 320 may switch to the VMX non-root mode and then invoke the callback handler 316 in the VMX non-root mode.

In block 704, the computing device 100 determines whether the root hypervisor 320 has generated any updates to the VMX objects 326 (e.g., the VMCS 328 and/or the EPT 330). The computing device 100 may use any technique to determine whether the VMX objects 326 have been updated. For example, the non-root hypervisor 306 may receive or otherwise access the root hypervisor update list 324 from the root hypervisor 320. As described above, the root hypervisor update list 324 identifies VMX objects 326, fields, or other data of the VMX objects 326 that have been modified by the root hypervisor 320. The list 324 may also identify or otherwise include VMX objects 326, fields, or other data that the non-root hypervisor 306 requested the root hypervisor 320 to update. The list 324 may be embodied as a bitmap identifying fields of the VMCS 328 and/or the EPT 330 modified by the root hypervisor 320. In block 706, the computing device 100 checks whether any VMX objects 326 have been updated. If not, the method 700 branches ahead to block 710, described below. If the VMX objects 326 have been updated, the method 700 advances to block 708.

In block 708, the computing device 100 copies updates from the VMX objects 326 to the virtual VMX objects 308. The computing device 100 may copy only those VMX objects 326, fields, or other data that has changed, for example using the root hypervisor update list 324. In some embodiments, the non-root hypervisor 306 may copy data from the VMX objects 326 by making one or more calls to the root hypervisor API 318. Additionally or alternatively, in some embodiments, the non-root hypervisor 306 may be granted access to the VMX objects 326 by the root hypervisor 320, for example by executing a specialized processor instruction such as VMFUNC.

In block 710, the computing device 100 performs non-root hypervisor 306 processing of the VM exit. The non-root hypervisor 306 may perform any appropriate processing of the VM exit. The non-root hypervisor 306 may process the VM exit using the virtual VMX objects 308 as if the non-root hypervisor 306 were executing in VMX-root mode. In some embodiments, in block 712, the non-root hypervisor 306 may modify one or more virtual VMX objects 308 (e.g., the virtual VMCS 310 and/or the virtual EPT 312) during processing of the VM exit.

In block 714, after processing the VM exit, the computing device 100 determines whether the non-root hypervisor 306 has updated any virtual VMX objects 308. In block 716, the computing device 100 checks whether the virtual VMX objects 308 have been updated. If not, the method 700 branches ahead to block 720, in which the computing device 100 exits the callback handler 316 and resumes execution with the root hypervisor 320, for example resuming execution at block 524 of FIG. 5. Referring back to block 716, if the virtual VMX objects 308 have been updated, the method 700 proceeds to block 718, in which the computing device 100 creates a non-root hypervisor update list 314 identifying the virtual VMX objects 308, fields, or other data modified by the non-root hypervisor 306. For example, the list 314 may be embodied as a bitmap identifying particular fields of the virtual VMCS 310 and/or the virtual EPT 312 that have been modified by the non-root hypervisor 306. After preparing the list 314, the method 700 advances to block 720, in which the computing device 100 exits the callback handler 316 and resume execution with the root hypervisor 320 as described above. For example, in some embodiments the computing device 100 may execute a virtual machine entry to exit the callback handler 316 and return to the root hypervisor 320 in the VMX-root mode. After resuming execution with the root hypervisor 320, the method 700 is completed.

EXAMPLES

Illustrative examples of the technologies disclosed herein are provided below. An embodiment of the technologies may include any one or more, and any combination of, the examples described below.

Example 1 includes a computing device for multi-level virtualization, the computing device comprising a processor having root virtualization mode support and non-root virtualization mode support; and one or more memory devices having stored therein a plurality of instructions that, when executed by the processor, cause the computing device to receive, by a root hypervisor of the computing device, a virtual machine exit generated by a virtual machine of the computing device, wherein the virtual machine is hosted by a non-root hypervisor of the computing device; determine, by the root hypervisor in the root virtualization mode, whether a callback handler of the non-root hypervisor is registered for an exit reason of the virtual machine exit in response to receipt of the virtual machine exit; determine, by the root hypervisor in the root virtualization mode, whether a trigger condition associated with the callback handler is satisfied in response to a determination that the callback handler is registered; and execute the callback handler of the non-root hypervisor in response to a determination that the trigger condition is satisfied.

Example 2 includes the subject matter of Example 1, and wherein the plurality of instructions, when executed by the processor, further cause the computing device to process, by the root hypervisor in the root virtualization mode, the virtual machine exit in response to a determination that a callback handler of the non-root hypervisor is not registered for the exit reason of the virtual machine exit; and resume, by the root hypervisor, execution of the virtual machine in response to processing of the virtual machine exit.

Example 3 includes the subject matter of any of Examples 1 and 2, and wherein the plurality of instructions, when executed by the processor, further cause the computing device to resume, by the root hypervisor, execution of the virtual machine in response to a determination that the trigger condition is not satisfied.

Example 4 includes the subject matter of any of Examples 1-3, and wherein the plurality of instructions, when executed by the processor, further cause the computing device to modify, by the root hypervisor in the root virtualization mode, the virtualization support object in response to the receipt of the virtual machine exit; and generate, by the root hypervisor in the root virtualization mode, a list of changes to the virtualization support object in response to a modification of the virtualization support object; wherein to execute the callback handler of the non-root hypervisor comprises to provide the non-root hypervisor the list of changes to the virtualization support object.

Example 5 includes the subject matter of any of Examples 1-4, and wherein the plurality of instructions, when executed by the processor, further cause the computing device to update, by the non-root hypervisor, the virtual virtualization support object based on the virtualization support object, with the list of changes to the virtualization support object.

Example 6 includes the subject matter of any of Examples 1-5, and wherein the virtualization support object comprises a virtual machine control structure (VMCS); and the virtual virtualization support object comprises a virtual VMCS.

Example 7 includes the subject matter of any of Examples 1-6, and wherein the virtualization support object comprises an extended page table; and the virtual virtualization support object comprises a virtual extended page table.

Example 8 includes the subject matter of any of Examples 1-7, and wherein the plurality of instructions, when executed by the processor, further cause the computing device to determine, by the root hypervisor in the root virtualization mode, whether a virtual virtualization support object of the non-root hypervisor has been modified in response to execution of the callback handler; update, by the root hypervisor in the root virtualization mode, a virtualization support object of the computing device based on the virtual virtualization support object in response to a determination that the virtual virtualization support object has been modified; and resume, by the root hypervisor, execution of the virtual machine in response to an update of the virtualization support object.

Example 9 includes the subject matter of any of Examples 1-8, and wherein to update the virtualization support object further comprises to verify, by the root hypervisor, validity of the virtual virtualization support object.

Example 10 includes the subject matter of any of Examples 1-9, and wherein the plurality of instructions, when executed by the processor, further cause the computing device to modify, by the non-root hypervisor, the virtual virtualization support object in response to execution of the callback handler; and generate, by the non-root hypervisor, a list of changes to the virtual virtualization support object in response to modification the virtual virtualization support object; wherein to determine whether the virtual virtualization support object of the non-root hypervisor has been modified comprises to determine, by the root hypervisor, whether the virtual virtualization support object has been modified based on the list of changes to the virtual virtualization support object.

Example 11 includes the subject matter of any of Examples 1-10, and wherein the virtualization support object comprises a virtual machine control structure (VMCS); and the virtual virtualization support object comprises a virtual VMCS.

Example 12 includes the subject matter of any of Examples 1-11, and wherein the virtualization support object comprises an extended page table; and the virtual virtualization support object comprises a virtual extended page table.

Example 13 includes the subject matter of any of Examples 1-12, and wherein to execute the callback handler of the non-root hypervisor comprises to execute the callback handler of the non-root hypervisor in the non-root virtualization mode of the processor.

Example 14 includes the subject matter of any of Examples 1-13, and wherein the plurality of instructions, when executed by the processor, further cause the computing device to determine, by the non-root hypervisor, whether the non-root hypervisor is executed in the non-root virtualization mode; and register, by the non-root hypervisor, the callback handler and the associated trigger condition with the root hypervisor in response to a determination that the non-root hypervisor is executed in the non-root virtualization mode.

Example 15 includes the subject matter of any of Examples 1-14, and wherein the plurality of instructions, when executed by the processor, further cause the computing device to host, by the non-root hypervisor in the root virtualization mode, the virtual machine in response to a determination that the non-root hypervisor is not executed in the non-root virtualization mode.

Example 16 includes the subject matter of any of Examples 1-15, and wherein the plurality of instructions, when executed by the processor, further cause the computing device to monitor, by the root hypervisor in the root virtualization mode, execution of the non-root hypervisor.

Example 17 includes the subject matter of any of Examples 1-16, and wherein the plurality of instructions, when executed by the processor, further cause the computing device to monitor, by the root hypervisor in the root virtualization mode, execution of a host operating system of the computing device, wherein the host operating system hosts the non-root hypervisor.

Example 18 includes a method for multi-level virtualization, the method comprising receiving, by a root hypervisor of a computing device, a virtual machine exit generated by a virtual machine of the computing device, wherein the virtual machine is hosted by a non-root hypervisor of the computing device; determining, by the root hypervisor in a root virtualization mode of a processor of the computing device, whether a callback handler of the non-root hypervisor is registered for an exit reason of the virtual machine exit in response to receiving the virtual machine exit; determining, by the root hypervisor in the root virtualization mode, whether a trigger condition associated with the callback handler is satisfied in response to determining that the callback handler is registered; and executing, by the computing device, the callback handler of the non-root hypervisor in response to determining that the trigger condition is satisfied.

Example 19 includes the subject matter of Example 18, and by the root hypervisor in the root virtualization mode, the virtual machine exit in response to determining that a callback handler of the non-root hypervisor is not registered for the exit reason of the virtual machine exit; and resuming, by the root hypervisor, execution of the virtual machine in response to processing the virtual machine exit.

Example 20 includes the subject matter of any of Examples 18 and 19, and further including resuming, by the root hypervisor, execution of the virtual machine in response to determining that the trigger condition is not satisfied.

Example 21 includes the subject matter of any of Examples 18-20, and further including modifying, by the root hypervisor in the root virtualization mode, a virtualization support object in response to receiving the virtual machine exit; and generating, by the root hypervisor in the root virtualization mode, a list of changes to the virtualization support object in response to modifying the virtualization support object; wherein executing the callback handler of the non-root hypervisor comprises providing the non-root hypervisor the list of changes to the virtualization support object.

Example 22 includes the subject matter of any of Examples 18-21, and further including updating, by the non-root hypervisor, a virtual virtualization support object based on the virtualization support object, using the list of changes to the virtualization support object.

Example 23 includes the subject matter of any of Examples 18-22, and wherein the virtualization support object comprises a virtual machine control structure (VMCS); and the virtual virtualization support object comprises a virtual VMCS.

Example 24 includes the subject matter of any of Examples 18-23, and wherein the virtualization support object comprises an extended page table; and the virtual virtualization support object comprises a virtual extended page table.

Example 25 includes the subject matter of any of Examples 18-24, and further including determining, by the root hypervisor in the root virtualization mode, whether a virtual virtualization support object of the non-root hypervisor has been modified in response to executing the callback handler; updating, by the root hypervisor in the root virtualization mode, a virtualization support object of the computing device based on the virtual virtualization support object in response to determining that the virtual virtualization support object has been modified; and resuming, by the root hypervisor, execution of the virtual machine in response to updating the virtualization support object.

Example 26 includes the subject matter of any of Examples 18-25, and wherein updating the virtualization support object further comprises verifying, by the root hypervisor, validity of the virtual virtualization support object.

Example 27 includes the subject matter of any of Examples 18-26, and further including modifying, by the non-root hypervisor, the virtual virtualization support object in response to executing the callback handler; and generating, by the non-root hypervisor, a list of changes to the virtual virtualization support object in response to modifying the virtual virtualization support object; wherein determining whether the virtual virtualization support object of the non-root hypervisor has been modified comprises determining, by the root hypervisor, whether the virtual virtualization support object has been modified based on the list of changes to the virtual virtualization support object.

Example 28 includes the subject matter of any of Examples 18-27, and wherein the virtualization support object comprises a virtual machine control structure (VMCS); and the virtual virtualization support object comprises a virtual VMCS.

Example 29 includes the subject matter of any of Examples 18-28, and wherein the virtualization support object comprises an extended page table; and the virtual virtualization support object comprises a virtual extended page table.

Example 30 includes the subject matter of any of Examples 18-29, and wherein executing the callback handler of the non-root hypervisor comprises executing the callback handler of the non-root hypervisor in a non-root virtualization mode of the processor of the computing device.

Example 31 includes the subject matter of any of Examples 18-30, and further including determining, by the non-root hypervisor, whether the non-root hypervisor is executed in a non-root virtualization mode of the processor of the computing device; and registering, by the non-root hypervisor, the callback handler and the associated trigger condition with the root hypervisor in response to determining that the non-root hypervisor is executed in the non-root virtualization mode.

Example 32 includes the subject matter of any of Examples 18-31, and further including hosting, by the non-root hypervisor in the root virtualization mode, the virtual machine in response to determining that the non-root hypervisor is not executed in the non-root virtualization mode.

Example 33 includes the subject matter of any of Examples 18-32, and further including monitoring, by the root hypervisor in the root virtualization mode, execution of the non-root hypervisor.

Example 34 includes the subject matter of any of Examples 18-33, and, further including monitoring, by the root hypervisor in the root virtualization mode, execution of a host operating system of the computing device, wherein the host operating system hosts the non-root hypervisor.

Example 35 includes a computing device comprising a processor; and a memory having stored therein a plurality of instructions that when executed by the processor cause the computing device to perform the method of any of Examples 18-34.

Example 36 includes one or more machine readable storage media comprising a plurality of instructions stored thereon that in response to being executed result in a computing device performing the method of any of Examples 18-34.

Example 37 includes a computing device comprising means for performing the method of any of Examples 18-34.

Example 38 includes a computing device for multi-level virtualization, the computing device comprising means for receiving, by a root hypervisor of the computing device, a virtual machine exit generated by a virtual machine of the computing device, wherein the virtual machine is hosted by a non-root hypervisor of the computing device; means for determining, by the root hypervisor in a root virtualization mode of a processor of the computing device, whether a callback handler of the non-root hypervisor is registered for an exit reason of the virtual machine exit in response to receiving the virtual machine exit; means for determining, by the root hypervisor in the root virtualization mode, whether a trigger condition associated with the callback handler is satisfied in response to determining that the callback handler is registered; and means for executing the callback handler of the non-root hypervisor in response to determining that the trigger condition is satisfied.

Example 39 includes the subject matter of Example 38, and further including means for processing, by the root hypervisor in the root virtualization mode, the virtual machine exit in response to determining that a callback handler of the non-root hypervisor is not registered for the exit reason of the virtual machine exit; and means for resuming, by the root hypervisor, execution of the virtual machine in response to processing the virtual machine exit.

Example 40 includes the subject matter of any of Examples 38 and 39, and further including means for resuming, by the root hypervisor, execution of the virtual machine in response to determining that the trigger condition is not satisfied.

Example 41 includes the subject matter of any of Examples 38-40, and further including means for modifying, by the root hypervisor in the root virtualization mode, a virtualization support object in response to receiving the virtual machine exit; and means for generating, by the root hypervisor in the root virtualization mode, a list of changes to the virtualization support object in response to modifying the virtualization support object; wherein the means for executing the callback handler of the non-root hypervisor comprises means for providing the non-root hypervisor the list of changes to the virtualization support object.

Example 42 includes the subject matter of any of Examples 38-41, and further including means for updating, by the non-root hypervisor, a virtual virtualization support object based on the virtualization support object, using the list of changes to the virtualization support object.

Example 43 includes the subject matter of any of Examples 38-42, and wherein the virtualization support object comprises a virtual machine control structure (VMCS); and the virtual virtualization support object comprises a virtual VMCS.

Example 44 includes the subject matter of any of Examples 38-43, and wherein the virtualization support object comprises an extended page table; and the virtual virtualization support object comprises a virtual extended page table.

Example 45 includes the subject matter of any of Examples 38-44, and further including means for determining, by the root hypervisor in the root virtualization mode, whether a virtual virtualization support object of the non-root hypervisor has been modified in response to executing the callback handler; means for updating, by the root hypervisor in the root virtualization mode, a virtualization support object of the computing device based on the virtual virtualization support object in response to determining that the virtual virtualization support object has been modified; and means for resuming, by the root hypervisor, execution of the virtual machine in response to updating the virtualization support object.

Example 46 includes the subject matter of any of Examples 38-45, and wherein the means for updating the virtualization support object further comprises means for verifying, by the root hypervisor, validity of the virtual virtualization support object.

Example 47 includes the subject matter of any of Examples 38-46, and further including means for modifying, by the non-root hypervisor, the virtual virtualization support object in response to executing the callback handler; and means for generating, by the non-root hypervisor, a list of changes to the virtual virtualization support object in response to modifying the virtual virtualization support object; wherein the means for determining whether the virtual virtualization support object of the non-root hypervisor has been modified comprises means for determining, by the root hypervisor, whether the virtual virtualization support object has been modified based on the list of changes to the virtual virtualization support object.

Example 48 includes the subject matter of any of Examples 38-47, and wherein the virtualization support object comprises a virtual machine control structure (VMCS); and the virtual virtualization support object comprises a virtual VMCS.

Example 49 includes the subject matter of any of Examples 38-48, and wherein the virtualization support object comprises an extended page table; and the virtual virtualization support object comprises a virtual extended page table.

Example 50 includes the subject matter of any of Examples 38-49, and wherein the means for executing the callback handler of the non-root hypervisor comprises means for executing the callback handler of the non-root hypervisor in a non-root virtualization mode of the processor of the computing device.

Example 51 includes the subject matter of any of Examples 38-50, and further including means for determining, by the non-root hypervisor, whether the non-root hypervisor is executed in a non-root virtualization mode of the processor of the computing device; and means for registering, by the non-root hypervisor, the callback handler and the associated trigger condition with the root hypervisor in response to determining that the non-root hypervisor is executed in the non-root virtualization mode.

Example 52 includes the subject matter of any of Examples 38-51, and further including means for hosting, by the non-root hypervisor in the root virtualization mode, the virtual machine in response to determining that the non-root hypervisor is not executed in the non-root virtualization mode.

Example 53 includes the subject matter of any of Examples 38-52, and further including means for monitoring, by the root hypervisor in the root virtualization mode, execution of the non-root hypervisor.

Example 54 includes the subject matter of any of Examples 38-53, and further including means for monitoring, by the root hypervisor in the root virtualization mode, execution of a host operating system of the computing device, wherein the host operating system hosts the non-root hypervisor.

The invention claimed is:

1. A computing device for multi-level virtualization, the computing device comprising:
a processor having root virtualization mode support and non-root virtualization mode support; and
one or more memory devices having stored therein a plurality of instructions that, when executed by the processor, cause the computing device to:

receive, by a root hypervisor of the computing device, a virtual machine exit generated by a virtual machine of the computing device, wherein the virtual machine is hosted by a non-root hypervisor of the computing device;

determine, by the root hypervisor in the root virtualization mode, whether a callback handler of the non-root hypervisor is registered for an exit reason of the virtual machine exit in response to receipt of the virtual machine exit;

determine, by the root hypervisor in the root virtualization mode, whether a trigger condition associated with the callback handler is satisfied in response to a determination that the callback handler is registered; and execute the callback handler of the non-root hypervisor in response to a determination that the trigger condition is satisfied.

2. The computing device of claim 1, wherein the plurality of instructions, when executed by the processor, further cause the computing device to:

process, by the root hypervisor in the root virtualization mode, the virtual machine exit in response to a determination that a callback handler of the non-root hypervisor is not registered for the exit reason of the virtual machine exit; and resume, by the root hypervisor, execution of the virtual machine in response to processing of the virtual machine exit.

3. The computing device of claim 1, wherein the plurality of instructions, when executed by the processor, further cause the computing device to:

modify, by the root hypervisor in the root virtualization mode, the virtualization support object in response to the receipt of the virtual machine exit; and generate, by the root hypervisor in the root virtualization mode, a list of changes to the virtualization support object in response to a modification of the virtualization support object;

wherein to execute the callback handler of the non-root hypervisor comprises to provide the non-root hypervisor the list of changes to the virtualization support object.

4. The computing device of claim 3, wherein the plurality of instructions, when executed by the processor, further cause the computing device to update, by the non-root hypervisor, the virtual virtualization support object based on the virtualization support object, with the list of changes to the virtualization support object.

5. The computing device of claim 1, wherein the plurality of instructions, when executed by the processor, further cause the computing device to:

determine, by the root hypervisor in the root virtualization mode, whether a virtual virtualization support object of the non-root hypervisor has been modified in response to execution of the callback handler;

update, by the root hypervisor in the root virtualization mode, a virtualization support object of the computing device based on the virtual virtualization support object in response to a determination that the virtual virtualization support object has been modified; and resume, by the root hypervisor, execution of the virtual machine in response to an update of the virtualization support object.

6. The computing device of claim 5, wherein to update the virtualization support object further comprises to verify, by the root hypervisor, validity of the virtual virtualization support object.

7. The computing device of claim 5, wherein the plurality of instructions, when executed by the processor, further cause the computing device to:

modify, by the non-root hypervisor, the virtual virtualization support object in response to execution of the callback handler; and generate, by the non-root hypervisor, a list of changes to the virtual virtualization support object in response to modification the virtual virtualization support object;

wherein to determine whether the virtual virtualization support object of the non-root hypervisor has been modified comprises to determine, by the root hypervisor, whether the virtual virtualization support object has been modified based on the list of changes to the virtual virtualization support object.

8. The computing device of claim 1, wherein to execute the callback handler of the non-root hypervisor comprises to execute the callback handler of the non-root hypervisor in the non-root virtualization mode of the processor.

9. The computing device of claim 1, wherein the plurality of instructions, when executed by the processor, further cause the computing device to:

determine, by the non-root hypervisor, whether the non-root hypervisor is executed in the non-root virtualization mode; and register, by the non-root hypervisor, the callback handler and the associated trigger condition with the root hypervisor in response to a determination that the non-root hypervisor is executed in the non-root virtualization mode.

10. The computing device of claim 1, wherein the plurality of instructions, when executed by the processor, further cause the computing device to monitor, by the root hypervisor in the root virtualization mode, execution of the non-root hypervisor.

11. A method for multi-level virtualization, the method comprising:

receiving, by a root hypervisor of a computing device, a virtual machine exit generated by a virtual machine of the computing device, wherein the virtual machine is hosted by a non-root hypervisor of the computing device;

determining, by the root hypervisor in a root virtualization mode of a processor of the computing device, whether a callback handler of the non-root hypervisor is registered for an exit reason of the virtual machine exit in response to receiving the virtual machine exit;

determining, by the root hypervisor in the root virtualization mode, whether a trigger condition associated with the callback handler is satisfied in response to determining that the callback handler is registered; and executing, by the computing device, the callback handler of the non-root hypervisor in response to determining that the trigger condition is satisfied.

12. The method of claim 11, further comprising:

processing, by the root hypervisor in the root virtualization mode, the virtual machine exit in response to determining that a callback handler of the non-root hypervisor is not registered for the exit reason of the virtual machine exit; and resuming, by the root hypervisor, execution of the virtual machine in response to processing the virtual machine exit.

13. The method of claim 11, further comprising:
modifying, by the root hypervisor in the root virtualization mode, a virtualization support object in response to receiving the virtual machine exit; and
generating, by the root hypervisor in the root virtualization mode, a list of changes to the virtualization support object in response to modifying the virtualization support object;
wherein executing the callback handler of the non-root hypervisor comprises providing the non-root hypervisor the list of changes to the virtualization support object.

14. The method of claim 11, further comprising:
determining, by the root hypervisor in the root virtualization mode, whether a virtual virtualization support object of the non-root hypervisor has been modified in response to executing the callback handler;
updating, by the root hypervisor in the root virtualization mode, a virtualization support object of the computing device based on the virtual virtualization support object in response to determining that the virtual virtualization support object has been modified; and
resuming, by the root hypervisor, execution of the virtual machine in response to updating the virtualization support object.

15. The method of claim 14, wherein updating the virtualization support object further comprises verifying, by the root hypervisor, validity of the virtual virtualization support object.

16. The method of claim 11, wherein executing the callback handler of the non-root hypervisor comprises executing the callback handler of the non-root hypervisor in a non-root virtualization mode of the processor of the computing device.

17. The method of claim 11, further comprising monitoring, by the root hypervisor in the root virtualization mode, execution of the non-root hypervisor.

18. One or more non-transitory, computer-readable storage media comprising a plurality of instructions that in response to being executed cause a computing device to:
receive, by a root hypervisor of the computing device, a virtual machine exit generated by a virtual machine of the computing device, wherein the virtual machine is hosted by a non-root hypervisor of the computing device;
determine, by the root hypervisor in a root virtualization mode of a processor of the computing device, whether a callback handler of the non-root hypervisor is registered for an exit reason of the virtual machine exit in response to receiving the virtual machine exit;
determine, by the root hypervisor in the root virtualization mode, whether a trigger condition associated with the callback handler is satisfied in response to determining that the callback handler is registered; and
execute the callback handler of the non-root hypervisor in response to determining that the trigger condition is satisfied.

19. The one or more non-transitory, computer-readable storage media of claim 18, further comprising a plurality of instructions that in response to being executed cause the computing device to:
process, by the root hypervisor in the root virtualization mode, the virtual machine exit in response to determining that a callback handler of the non-root hypervisor is not registered for the exit reason of the virtual machine exit; and
resume, by the root hypervisor, execution of the virtual machine in response to processing the virtual machine exit.

20. The one or more non-transitory, computer-readable storage media of claim 18, further comprising a plurality of instructions that in response to being executed cause the computing device to:
modify, by the root hypervisor in the root virtualization mode, a virtualization support object in response to receiving the virtual machine exit; and
generate, by the root hypervisor in the root virtualization mode, a list of changes to the virtualization support object in response to modifying the virtualization support object;
wherein to execute the callback handler of the non-root hypervisor comprises to provide the non-root hypervisor the list of changes to the virtualization support object.

21. The one or more non-transitory, computer-readable storage media of claim 18, further comprising a plurality of instructions that in response to being executed cause the computing device to:
determine, by the root hypervisor in the root virtualization mode, whether a virtual virtualization support object of the non-root hypervisor has been modified in response to executing the callback handler;
update, by the root hypervisor in the root virtualization mode, a virtualization support object of the computing device based on the virtual virtualization support object in response to determining that the virtual virtualization support object has been modified; and
resume, by the root hypervisor, execution of the virtual machine in response to updating the virtualization support object.

22. The one or more non-transitory, computer-readable storage media of claim 21, wherein to update the virtualization support object further comprises to verify, by the root hypervisor, validity of the virtual virtualization support object.

23. The one or more non-transitory, computer-readable storage media of claim 18, wherein to execute the callback handler of the non-root hypervisor comprises to execute the callback handler of the non-root hypervisor in a non-root virtualization mode of the processor of the computing device.

24. The one or more non-transitory, computer-readable storage media of claim 18, further comprising a plurality of instructions that in response to being executed cause the computing device to monitor, by the root hypervisor in the root virtualization mode, execution of the non-root hypervisor.

* * * * *